April 5, 1938.  C. E. WILSON  2,112,872

PLANT POTTING AND PACKING MACHINE

Filed Sept. 2, 1936   3 Sheets-Sheet 1

Inventor
Clarence E. Wilson

By Munn Anderson + Liddy
Attorney

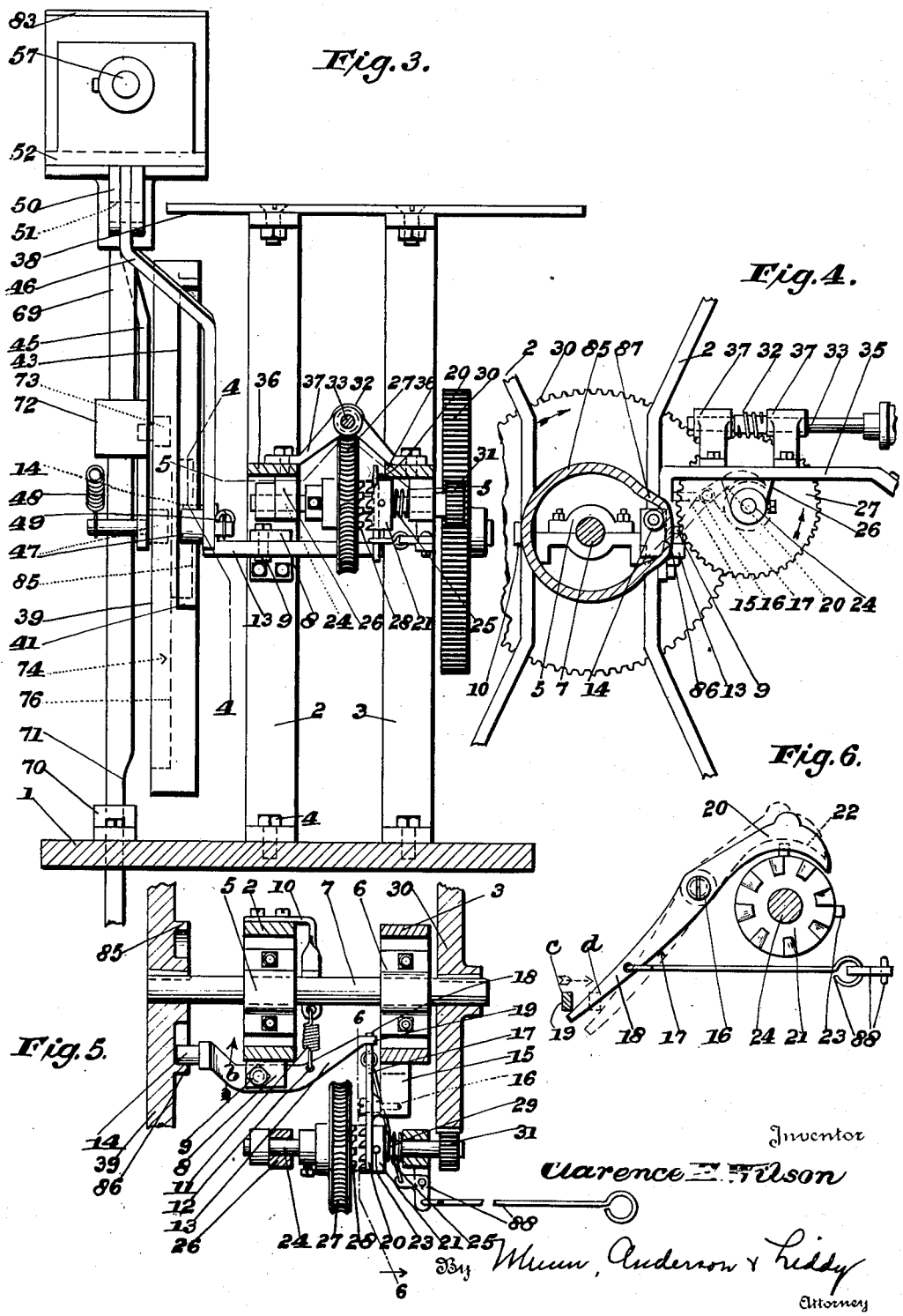

April 5, 1938.  C. E. WILSON  2,112,872
PLANT POTTING AND PACKING MACHINE
Filed Sept. 2, 1936  3 Sheets-Sheet 3
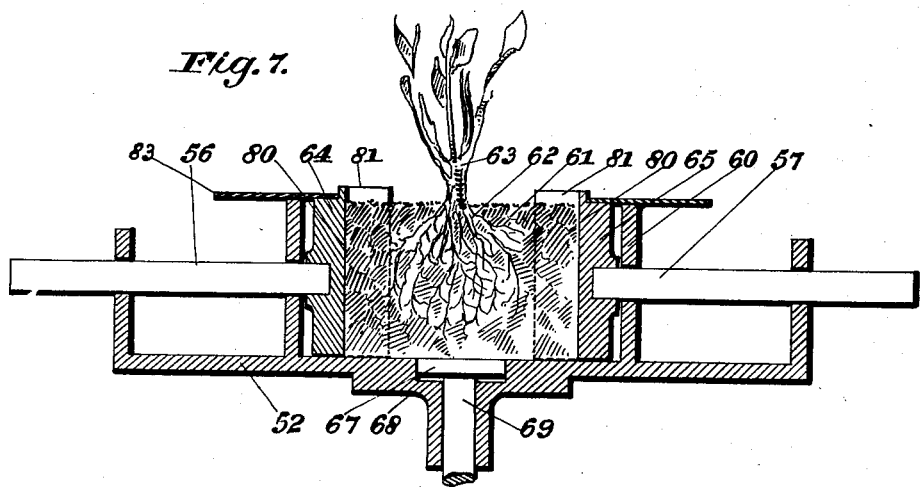
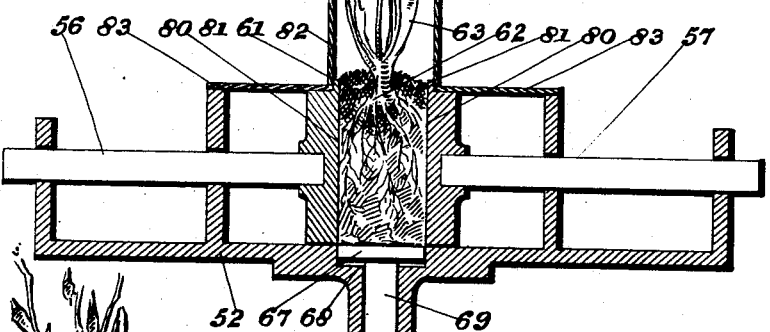
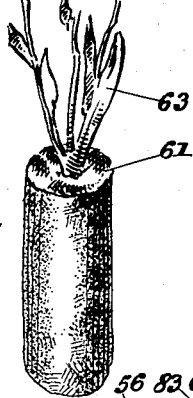
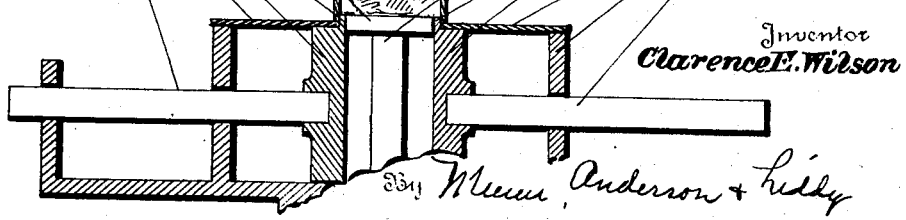
Inventor
Clarence E. Wilson Patented Apr. 5, 1938

2,112,872

UNITED STATES PATENT OFFICE 2,112,872

PLANT POTTING AND PACKING MACHINE

Clarence E. Wilson, Manchester, Conn.

Application September 2, 1936, Serial No. 99,173

8 Claims. (Cl. 226—1)

This invention relates to improvements in machines for packing materials into containers, and its objects are as follows:

First, to provide a machine for both potting and packing plants in such a manner that the growth of the plant may continue while the container is either in storage for a limited time or is being shipped.

Second, to provide a machine to both compact a quantity of earth around the roots of the plant, then thrust the earth-plug and plant into a container for the foregoing purposes.

Third, to do the compacting by use of a split cylinder, the halves of which are alternately moved toward and away from each other into closed and open positions, first to receive the earth and plant roots, second to close the earth in upon and around the roots to perfect a plug.

Other objects and advantages will appear in the following specification, reference being had to the accompanying drawings in which:

Figure 3 is a side elevation of the machine, parts being shown in section.

Figure 4 is a detail cross section taken substantially on the line 4—4 of Fig. 3.

Figure 5 is a detail cross section taken on the line 5—5 of Fig. 3.

Figure 6 is a detail cross section taken on the line 6—6 of Fig. 5.

Figure 7 is a diagrammatic section of the packing means of the machine, illustrating the first step of receiving the earth and plant roots.

Figure 8 is a similar view, illustrating the second step of compacting the earth around the roots.

Figure 9 is a detail perspective view of the earth-plug and plant.

Figure 10 is a view similar to Figs. 7 and 8, illustrating the third step of pushing the earth-plug and plant into the container tube.

Figure 1:
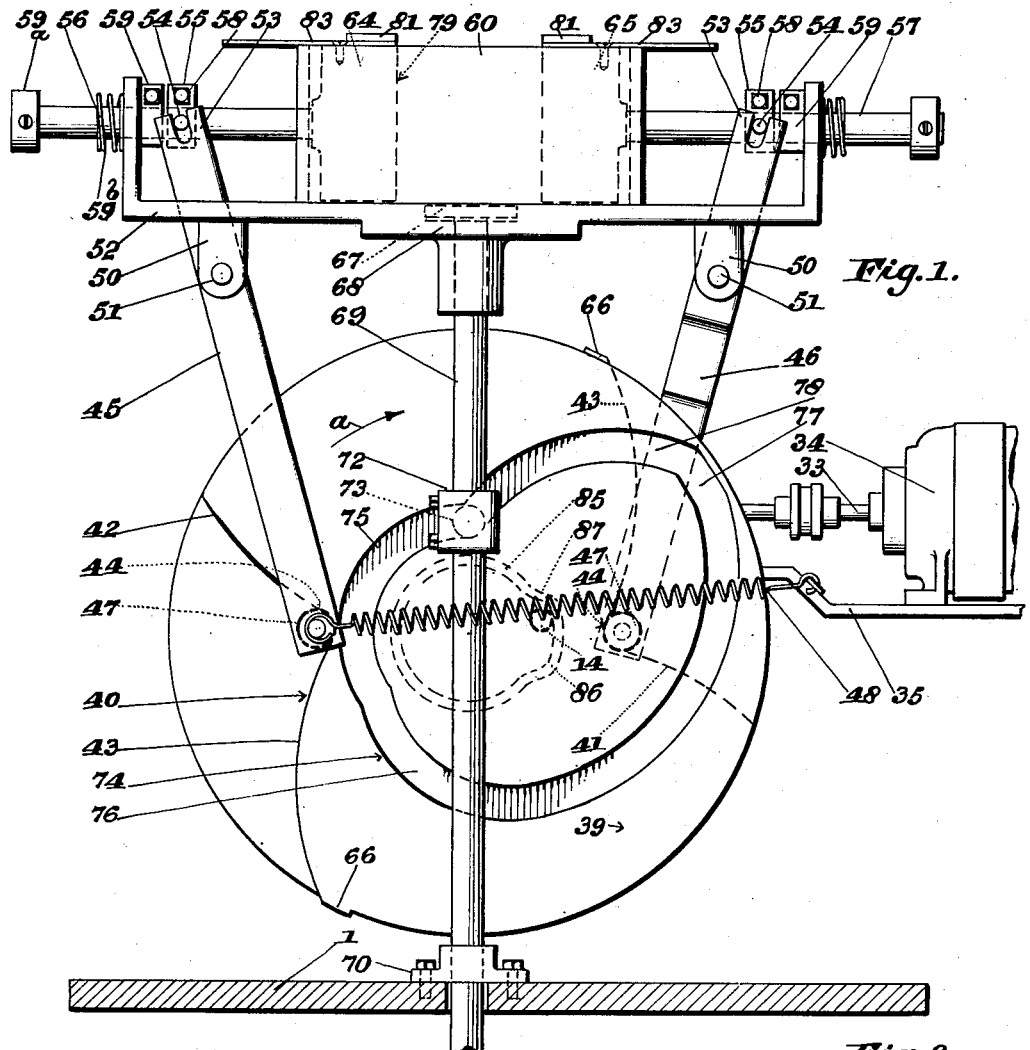
Figure 1 is an end elevation of the improved machine, parts being shown in section.

This machine facilitates the potting and packing of growing plants into container tubes, said tubes being composed of any material of sufficient durability to properly contain the moist earth for a limited time, but also disintegrable in nature so that it will waste away if and when planted in the open ground. This plan of handling growing plants is a comparatively recent development in plant husbandry, and since it has reached substantial proportions it is necessary to replace the customary hand-operation with machine-operation which will insure doing the work better and both more uniformly and quickly.

In carrying out the invention, provision is made of a suitable base 1, which may be a floor, to the top surface of which the framework, represented by a pair of standards 2, 3, is bolted as at 4 (Fig. 3). These standards, which can be made according to any desired pattern, include axially alined center bearings 5, 6 (Fig. 5) in which a cam shaft 7 is journalled. A bracket 8 (Figs. 3 and 5) is secured to a portion of the standard 2 and carries a pivot bolt 9.

A spring bracket 10 (Fig. 5) is secured to another portion of the standard 2. This bracket has one end of a spring 11 attached to it, the other end of the spring being attached to a pin 12 on a lever 13 which is mounted on the bolt 9. One end of the lever carries a roller 14 (Fig. 5). A third bracket 15, this one on the standard 3, carries a pivot pin 16 on which a clutch lever 17 is turnably mounted. The arm 18 of this lever extends into the path of the free end 19 of the lever 13. The head 20 of the clutch lever is heavy enough to make said lever turn clockwise (Fig. 6) and maintain contact with the free end 19.

The head 20 is arc-shaped so as to partially conform to the shape of the movable clutch member 21 which it is adapted to move. For this purpose the head has a cam surface 22 which, when in the full-line position of the clutch lever (Fig. 6), will intercept the first one of a plurality of pins 23 on the supposedly rotating clutch member 21. The resulting cam action shifts the clutch member to the right on the clutch shaft 24 against the tension of a spring 25 between said member and the nearest one of a pair of bearings 26.

A worm gear 27, loose on the cam shaft 24, has a clutch face 28 corresponding with the clutch face of the member 21. The latter is slidable on a spline 29, and when the clutch faces are interengaged, the resulting driving of a large spur gear 30 by means of a spur pinion 31 on the clutch shaft rotates the cam shaft 7, inasmuch as the large spur gear is affixed to the cam shaft.

The worm gear 27 is driven by a worm pinion 32 on the shaft 33 of a motor 34. This motor is mounted on an appropriate support 35 which is forked at 36 adjacent to its attachment at one end to the framework 2, 3. Bearings 37 bridge the fork spaces, and are secured to the forks (Fig. 3) to carry the motor shaft 33. The previously mentioned bearings 26 are suspended below the forks. A table 38 (Fig. 3) provides a convenient work-place for the operator. This is secured to the upper ends of the standards 2, 3, serving to keep them properly spaced.

A cam wheel 39 is affixed to that end of the cam shaft 7 opposite to the one which carries the spur gear 30. This wheel has cam surfaces 40, 41 sunk in from the periphery of the wheel and situated on opposite sides (Fig. 1). Each so-called surface consists of short and long distances 42, 43, meeting at valleys 44 which are the lowest cam points as regards the rockable levers 45, 46. The periphery of the wheel is the highest cam point, and it is by riding the cam surfaces and then the periphery of the wheel that rollers 47, journalled on the bottom ends of the levers, cause the levers to rock.

Springs 48, 49 (Fig. 3) keep the rollers in constant touch with the wheel 39. For this purpose one end of each spring is anchored to the framework, the remaining end of each being connected to the respective lever. Brackets 50 provide supports for the pivots 51 of the levers. These brackets project from the underside of a packing frame 52, upon which the earth is compacted around the plant roots according to Figs. 7 to 10.

For this purpose the upper forked ends 53 of the levers 45, 46 are fitted over trunnions 54 projecting from collars 55 that are clamped onto plungers 56, 57 by means of bolts 58 or their equivalents. As the arms 45, 46 are rocked the plungers 56, 57 are reciprocated. Adjustable clamp collars 59 on the plungers 56, 57 enable a regulation of the amount of earth to be compacted according to the manner presently set out. Other clamp collars 59ª, secured on the ends of the plungers, are adapted to abut and compress springs 59ᵇ, also on the plungers.

A rectangular form 60 is the receptacle for the earth 61 and the roots 62 (Fig. 7) of the plant 63. This form is shown as made integrally with the frame 52 (Figs. 7, 8, and 10) but this is not necessary, although it must be secured in a fixed position. The ends of the form as well as the upstanding ends of the frame have matching holes in which the plungers are guided.

The halves 64, 65 of what is herein known as a split cylinder, are situated in the form 60 (Fig. 2), being secured to the inner ends of the plungers 56, 57. As the plungers reciprocate, the two halves are alternately moved toward and away from each other, first assuming the closed position and then the open position, it being in the latter position (Fig. 7) that a quantity of earth is deposited together with the plant roots. The halves 64, 65 thus comprise the movable end walls of the form 60.

Inasmuch as the distance of separation of the split cylinder halves 64, 65 in the open position determines the capacity of the receptacle, it follows that if the plungers 56, 57 are intercepted on their outward strokes the halves will stop short of the far end walls of the form and so diminish the volume between the halves. The clamp collars 59 enable this regulation, for if they are adjusted farther out on the plungers 56, 57 they will strike the frame ends before the rollers 47 reach the valleys 44. The rollers will be held suspended until the long-distance cam surfaces 43 reach them, whereupon they are contacted to close the cylinder halves from the positions thus represented.

Each of the surfaces 43 terminates in a raised place 66 adjacent to the periphery of the cam wheel 39. These produce the maximum closure of the cylinder halves and the greatest compression of the earth-plug (Fig. 9). After these raised places pass the rollers 47, the cylinder halves relax and thus insure room for the passage of the ejecting piston 67.

Said piston occupies a recess 68 in the packing frame so that the floor of the frame will be level. The piston is mounted on the upper end of a rod 69 which is appropriately guided for vertical motion. One of the guides, designated 70, is made to accommodate the flattened side 71 of the rod. Said flattened side and the corresponding shape of the opening in the guide 70 prevent the rod from turning.

A clamp collar 72 on the piston rod 69 carries a roller 73 which occupies a cam track, generally designated 74, in one flat side of the cam wheel 39. Said track comprises a neutral portion 75, which is concentric to the axis of the cam wheel, a lift portion 76, which raises the piston 67 (Fig. 10), a rest portion or crest 77, which gives the operator an instant in which to clear off the top of the piston, and a return portion 78, which quickly drops the piston to its bottom or starting position.

Figure 2:
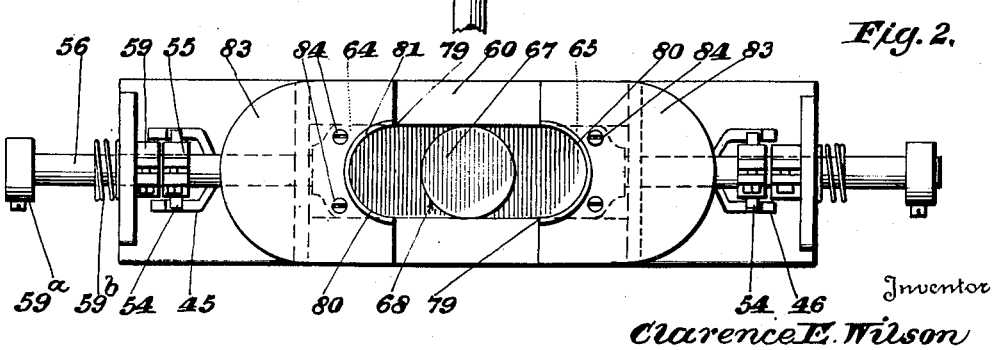
Figure 2 is a plan view of packing means alone.

Reverting to the packing means in Fig. 2, it is to be noted that the halves 64, 65 of the split cylinder terminate in vertical edges 79 that scrape the sides of the form 60 so that none of the earth can work in behind said halves during their advancing motions. The compacting of the earth is thus confined to the semi-cylindrical faces 80. The tops of the halves have flanges 81 which follow the contour of the faces 80, and provide a centering device when closed (Fig. 8) for the tubular container 82 which is then emplaced in the receiving position. Shields 83, fastened upon the cylinder halves as at 84, prevent earth from falling into the form behind said halves and so obstruct their retreating motions.

Upon reference to Figs. 1 and 5 it will be seen that there is a cam ring 85 on that side of the cam wheel 39 opposite to the one having the cam track 74. This ring is in the shape of a flange which stands out from the wheel (Fig. 5). It is concentric to the axis of the wheel with the exception of one place where the ring is outwardly recessed at 86. The recess is sufficiently long in its circumferential distance (Figs. 1 and 3) to dissipate the momentum of the cam wheel 39 upon the machine being stopped by the entrance of the roller 14 into said recess. The shoulder 87 has a cam action on the roller when the machine is started. Since the lever 13 that carries the roller and positions it inside of the ring is under the tension of the spring 11, it follows that the roller is kept in constant contact with the inside of the ring. Linkage, commonly designated 88 (Fig. 5), extends from the lever 13 to the standing position of the operator. A pull on the linkage re-starts the machine.

The operation is readily understood, and in this brief supplemental description reference is more fully made to Figs. 7 to 10. Fig. 1 illustrates the beginning of a cycle of operation of the machine. The operator pulls the linkage 88 (Fig. 5) which turns the lever 13 from the full-line position to the dotted line position in Fig. 6. This lifts the head 20 from the pin 23, letting the clutch member 21 engage the clutch face 28 by force of the spring 25. Upon the resulting starting of the machine the cam wheel 39 turns clockwise (arrow a, Fig. 1). The roller 14 is displaced from the recess 86 by the cam action of the adjacent shoulder 87 moving the end 19 of the lever 13 (Fig. 5) from the full-line position c into the dotted line position d (Fig. 6) to hold the clutch lever 17 up and permit the operator to release the handle end of the linkage 88. At the present moment the halves 64, 65 are farthest apart in the form 60, and the receptacle outlined by the frame bottom 52, the sides of the form 60 and the cylinder halves at the ends, is ready to receive a quantity of earth 61 (Fig. 7) together with the roots 62 of the plant 63.

At this point it is desired to explain that although earth is repeatedly mentioned as the packing material, it is proposed to use, at times, substitutes such as peat moss, etc. Further, there is practically no limit on the kind of plants to be packed, since these may be perennials, annuals, rose-bushes, small trees, shrubs, etc.

The so-called receptacle (Fig. 7) will be filled with earth substantially to the top. An outward adjustment of the clamp collars 59 (Fig. 1) on the plungers 56 will stop the halves 64, 65 short of the ends of the form 60 and so diminish the volume of the receptacle.

As the cam wheel 39 rotates (Fig. 1) the levers 45, 46 will be rocked by action of the long distance cams 43 on the rollers 47, thus moving the cylinder halves 64, 65 toward each other. Said halves are fully closed in cylindrical form (Fig. 8) when the raised places 66 (Fig. 1) come under the rollers 47. The earth 61 is then packed hardest around the plant roots, and, by preference, it is at this instant that the operator places a tube such as 82 (Fig. 8) upon the flanges 81. The extreme pressure is relaxed immediately upon the raised places passing beyond the rollers, and the attendant separation of the halves 64, 65, due to the spring 48, 49, and 59b, although slight, is perceptible enough to stretch the bottom of the tube a little and so insure its staying in place.

There is then ample clearance for the entrance of the piston 67, the slight setting back of the cylinder halves preventing the possibility of the then completed earth-plug (Fig. 9) from sticking. Up to this period in the operation, the piston 67 remains neutral because of the travel of the roller 73 in the neutral portion 75 of the cam track 74. As soon as the portion 76 reaches to roller 73, the latter together with the piston 67 is lifted. This continues for the duration of the lift portion 76 until the earth-plug is fully ejected as in Fig. 10. The cam wheel 39 thus comprises the common power source by which the levers 45, 46 and the rod 69 are sequentially operated respectively to move the halves 64, 65 together and to cause the piston 67 to push out the plug.

Prior to this event, as stated above, the operator has emplaced a tube 82 (Fig. 8) upon the flanges 81, so that when the plunger started upwardly the earth-plug was pushed into said tube. The latter is now removed, and while the piston stands still for the instant represented by the rest portion 77 of the cam track, the operator brushes off the top of the piston, thus clearing the machine for the next operation, which begins after the return portion of the cam track restores the cylinder halves 64, 65 to their fully retreated positions.

During the foregoing sequences the machine was started and stopped by the control mechanism represented by the linkage 88 and the clutch device (Fig. 5) and the cam ring 85 (Fig. 1). It is necessary for the machine to be stopped for an interval in the position of Fig. 1 so as to give the operator time in which to load the receptacle with earth and the plant roots.

The foregoing push against the linkage 88 restarts the machine. The re-arrival of the recess 86 at the roller 14 enables a reversal of the motions of the levers 13 and 17 (Fig. 5). The spring 11 (Fig. 5) turns the lever 13 so that its end 19 assumes the position c (Fig. 6). The head 20 again drops upon the clutch member 21, and the interception of the first pin 23 causes the disengagement of said member from the clutch face 28 by the action of the pin against the cam face 22. It is thus that the machine is stopped in readiness for the next operation.

I claim:

1. In a machine of the character described, packing means comprising an elongated form to receive material to be compacted, said form consisting of stationary side walls and movable end walls, means for moving said end walls toward each other to a closed position at which the material is compacted to a degree of maximum compression, means included in said previous means for slightly relaxing the closing pressure upon said end walls and also the compacting pressure on the resulting material plug, and means working perpendicularly of the packing space defined by all of the walls to push said plug out of the packing space upon the occurrence of said relaxation.

2. A machine of the character described comprising packing means which includes a form to receive material to be compacted, and further includes a pair of movable end walls, rockable levers which have means connecting them with the respective end walls to enable the back and forth movement of said walls, a cam wheel which has cam surfaces to cause the levers to rock first to close the end walls, second to open them, raised places included in the cam surfaces for producing a degree of maximum compression when the end walls are closed, and means to push the material plug from between the end walls and out of the form after said raised places have passed the levers and the pressure of the end walls on the plug is slightly relaxed.

3. A machine of the character described comprising a packing frame which has upstanding ends, a form centered upon the frame between the ends and adapted to receive material to be compacted, plungers guided by said upstanding ends and by the adjacent ends of the form, halves carried by the plungers inside of the form and constituting movable end walls, rockable levers and means by which they are loosely connected with the plungers, cams to work upon the levers for rocking them to move the plungers, said cams including short and long distance portions meeting at low valleys, and means adjustable outwardly on each plunger to be intercepted by the upstanding ends of the packing frame before the low valleys become effective on the levers thus stopping the end walls short of a full opening movement.

4. A machine of the character described comprising packing means which includes a form to receive material to be compacted, a pair of opposing movable end walls which when moved together compress the material into a plug, rockable levers and means by which they are connected at one end with the end walls, said rockable levers having rollers at the other ends, an ejecting piston located medially of the end walls in an initially lowered position in the form, said piston having a rod, and a cam wheel which has means to rotate it, said wheel having cam surfaces contacted by the rollers and shaped to actuate the end walls through said levers, said wheel also having a cam track with means to periodically raise the piston rod.

5. A machine of the character described comprising packing means which includes a form to receive material to be compacted, a pair of opposing movable end walls which when moved together compress the material into a plug, a medially situated ejector piston in an initially lowered position in the form, said piston having a rod and a roller, a cam wheel and means to rotate it, said wheel having a cam track in which the roller works, said track including a neutral portion which maintains the piston in said lowered position and a lifting portion which raises the piston to the top of the form, cam surfaces on the wheel including raising portions and valleys, rockable levers having rollers travelling on said cam surfaces, and having means by which the levers are loosely connected with the end walls, and adjustable means by which the lever connections are stopped short of a full stroke in the outward direction when the lever rollers travel toward the valleys, said rollers then being suspended clear of the valleys.

6. A machine of the character described comprising means which defines a material receptacle, said receptacle including movable walls to compress the material, a rotatable cam wheel which has cam surfaces and a cam track, actuating means disposed between the cam surfaces and the end walls to move them as stated, an ejector piston located medially of the end walls and having a rod with a roller, said roller projecting into the cam track which is shaped to raise the piston when the walls are together, and guide means for the piston rod, said rod having a flattened place which works against a corresponding flattened place in one of the guide means, so as to keep the rod from turning and thus displacing the rod-roller from the cam track.

7. A machine of the character described comprising means which defines a material receptacle, said receptacle including movable walls, a medially located ejector piston, a cam wheel with cam surfaces and a cam track, means between the cam surfaces and walls to move the walls back and forth, means between the cam track and piston to raise and lower the piston, and control mechanism to periodically start and stop the cam wheel, said mechanism including driving apparatus and a clutch, levers to actuate the clutch, one of the levers having a roller, and a cam ring on the wheel, said ring having a recess and cam approaches to move the roller and so turn the respective lever.

8. In a machine of the character described, packing means comprising a form to receive material to be compacted, said form including confronting and movable end walls, means for moving said walls toward each other to a closed position at which the material is compacted to a degree of maximum compression, means on said walls to then receive a tubular container, and means to slightly separate the walls thereby to stretch the bottom of the container and insure its staying in place.

CLARENCE E. WILSON.